Patented Nov. 17, 1925.

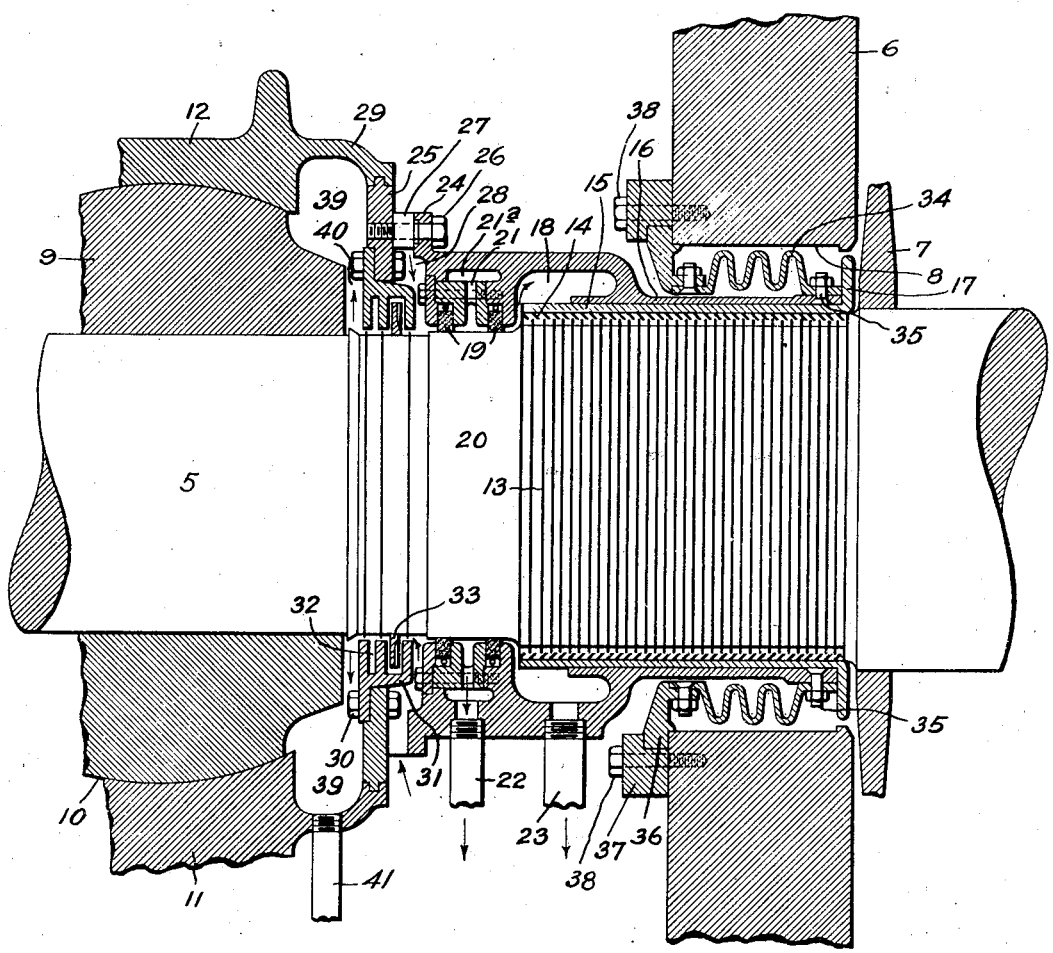

1,562,019

UNITED STATES PATENT OFFICE.

JAMES WILKINSON, OF LYNN, MASSACHUSETTS, ASSIGNOR TO GENERAL ELECTRIC COMPANY, A CORPORATION OF NEW YORK.

SHAFT PACKING FOR ELASTIC-FLUID TURBINES AND THE LIKE.

Application filed September 5, 1922. Serial No. 586,097.

*To all whom it may concern:*

Be it known that I, JAMES WILKINSON, a citizen of the United States, residing at Lynn, county of Essex, State of Massachusetts, have invented certain new and useful Improvements in Shaft Packings for Elastic-Fluid Turbines and the like, of which the following is a specification.

The present invention relates to shaft packings such as are used in connection with elastic fluid turbines and the like, to prevent leakage around the shaft where it projects through the casing and has for its object to provide an improved structure and arrangement in an apparatus of this character.

For a consideration of what I believe to be novel and my invention, attention is directed to the accompanying description and the claims appended thereto.

In the drawing, the figure is a sectional view of a packing structure embodying my invention.

Referring to the drawing, 5 indicates a rotating shaft such as the shaft of an elastic fluid turbine, and 6 indicates an end wall of the turbine casing or shell through which the shaft projects. One of the wheels of the turbine is indicated at 7 and the opening in the casing through which the shaft passes is indicated at 8. Shaft 5 is supported in a bearing comprising a pillow block 9 having a spherical surface which rests in a spherical seat 10 on a pedestal 11. The bearing cap is indicated at 12 and as is well understood it is bolted to the pedestal in the usual manner. The bearing structure is not illustrated in detail as its specific structure forms no part of the present invention. The arrangement shown is to be taken as typical of any suitable bearing structure.

On shaft 5 are a plurality of spaced annular packing teeth 13 which cooperate with sloping annular packing teeth 14 carried by a packing sleeve 15 which surrounds the shaft. Packing sleeve 15 fits in a carrying sleeve 16 and is provided with an end flange 17 which has a close clearance with the wall of opening 8. At the outer end of packing sleeve 15, carrying sleeve 16 is enlarged to provide an annular chamber 18 and beyond this chamber it carries a plurality of packing rings 19, for example carbon packing rings, which pack against a surface 20 on the shaft. In the present instance two spaced packing rings 19 are shown, the space between them being connected by passages 21 to an annular space 21ª from which leads a drain pipe 22. Connected to annular chamber 18 is a drain pipe 23.

As to certain aspects of my invention, the packing structure described may be taken as typical of any suitable shaft packing although the particular structure illustrated possesses certain advantages when combined with other features of my invention.

According to my invention, I support the stationary packing elements from a fixed part of the turbine structure other than the turbine casing itself, choosing a part which is relatively cool and is not subjected to wide temperature variations during operation. I accomplish this preferably by supporting the outer end of the stationary packing element from a fixed part of the adjacent turbine bearing. I then connect the inner end of the packing element to the turbine casing by means of a flexible member which while it forms a seal to prevent leakage between the stationary packing element and the turbine casing, permits the latter to expand and contract freely and without disturbing the shaft packing clearance.

In the arrangement illustrated in the drawing, the outer end of carrying sleeve 16 is provided with a flange 24 which is fixed to a ring 25 by bolts 26, there being spacers 27 between the ring and flange to space them apart so as to provide passages 28 for the circulation of air. Ring 25 is supported by an annular bracket 29 carried by a fixed part of the bearing structure, it being shown in the present instance as being carried by the pedestal 11 and cap 12. Fastened to ring 25 by bolts 30 is an annular member 31 which surrounds the shaft and has one or more annular grooves 32 which open toward the shaft. In one of the grooves 32 is an impeller 33 carried by shaft 5. The inner end of carrying sleeve 16 is connected to the turbine shell by means of a corrugated ring 34. One end of ring 34 is fastened to sleeve 16 by bolts 35 and the other end is fastened to a ring 36 which in turn is clamped on the outer surface of turbine shell 6 by an annular clamping member 37 and bolts 38.

Bracket 29, the adjacent end of the bearing, and ring 25 define in annular chamber 39 which is connected to the clearance space between member 31 and the shaft by an annular passage 40. Connected to chamber 39 is a drain pipe 41.

The packing structure illustrated is one particularly intended for the high pressure end of an elastic fluid turbine, wheel 7 being the first stage wheel. Elastic fluid leaking through between packing teeth 13 and 14 is discharged into annular chamber 18 from which chamber it is led away by pipe 23 to any desired point. Packing rings 19 serve to prevent leakage of elastic fluid along the shaft from chamber 18. Such elastic fluid as leaks past the first ring 19 flows through passages 21 to annular space $21^a$ and is led away by pipe 22. The rotation of impeller 33 in groove 32 serves to create a flow of air through passages 28 into the impeller and from the impeller along shaft 5 to passages 40, thence to chamber 39 and out by way of drain pipe 41. This flow of air serves to ventilate and cool the bearing. It also serves to carry away any elastic fluid which may leak past the outer packing ring 19. In addition to this, due to the flow of air outwardly along the shaft, oil from the end of the bearing is prevented from creeping along the shaft toward the packing. Flange 17 fills the opening 8 in the casing end wall 6 at the inner end thereof except for a small radial clearance and thus serves to prevent the free circulation of elastic fluid from the turbine casing around corrugated ring 34. It also serves to hold sleeve 15 in sleeve 16 due to the elastic fluid pressure on its inner face, that is, any tendency on the part of sleeve 15 to move to the right, as viewed in the drawing, is prevented by the elastic fluid pressure acting on the flanged end.

With the above described arrangement it will be clear that the turbine casing is free to expand and contract wholly independently of the stationary packing element and that any such expansion and contraction will not affect the packing clearances. At the same time flexible or yieldable connection 34 prevents any leakage of elastic fluid directly between the turbine shell and stationary packing element. The connection between the outer end of the stationary packing element and the stationary part of the bearing serves to hold the stationary packing element concentric with the shaft and since this connection is subjected to but small temperature variations it will be but little affected by expansion and contraction. Furthermore, since the inner end of the stationary packing element is substantially free, it can expand and contract evenly in all directions and hence is not likely to assume a position where rubbing will occur. The use of packing rings 19 in the position shown is advantageous since this type of packing is particularly efficient for lower pressures and where it is not subjected to great temperature changes. Furthermore, being at the outer end of the packing, the rings can be readily replaced when worn.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. The combination with an elastic-fluid turbine having a casing and a shaft projecting through an opening in said casing, of a concentric packing means for the shaft which extends exteriorly of the casing from a point adjacent the inner end of said opening, said means comprising a sleeve surrounding the shaft and lying in part within the opening, a flange at the inner end of the sleeve which forms substantially a closure for the opening, a concentric carrying sleeve which surrounds and supports the packing sleeve, the inner end of said carrying sleeve extending into abutting engagement with the flange, an adjacent stationary turbine part other than the casing, a ring adjacent the outer end of the carrying sleeve forming a rigid connection between the carrying sleeve and said adjacent stationary turbine part, said ring and part being spaced to provide passages between them, an annular chamber for which the ring forms a wall, and a corrugated flexible concentric ring surrounding the carrying sleeve and lying wholly within the opening in the casing, said last-named ring being connected at its outer end with the casing about the outer end of the opening and at its inner end with the inner end of the carrying sleeve.

2. The combination with an elastic-fluid turbine having a casing and a shaft projecting through an opening in said casing, of a packing means for the shaft comprising a packing sleeve surrounding the shaft in spaced concentric relation thereto, cooperating packing members carried by the shaft and the interior of the packing sleeve, a carrying sleeve surrounding and supporting the packing sleeve, an adjacent stationary turbine part other than the casing, a ring providing a rigid connection between said part and the carrying sleeve, said ring and part being spaced to provide passages between them, an annular chamber for which the ring forms a wall, a corrugated flexible ring surrounding the carrying sleeve, said last-named ring lying within the confines of the opening in the casing and forming a fluid-tight flexible connection between the casing and an inner end of the carrying sleeve, a ring packing adjacent the outer end of the carrying sleeve, and an annular chamber within the confines of the carrying sleeve adjacent the outer end of the packing sleeve.

3. The combination with a turbine having a casing and a shaft projecting outwardly of the casing through an opening therein, and an adjacent bearing for the shaft, of a packing carrying sleeve surrounding the shaft and extending within the confines of the opening in the casing, a flexible corrugated ring surrounding said sleeve within said opening, said ring being connected at its inner end with the sleeve and at its outer end with the casing, a packing sleeve having a flanged inner end, lying within the carrying sleeve, a toothed packing carried by the packing sleeve, a ring packing mounted in the carrying sleeve adjacent the outer end of the packing sleeve, a ring by which the carrying sleeve is supported, said ring being carried by the shaft bearing, means providing air passages between the ring and the carrying sleeve, and means connected with said air passages for creating a circulation of air from the air passages around the end of the bearing to ventilate it, said means including an oil baffle adjacent the bearing through which baffle the air is circulated in the direction of the bearing.

In witness whereof, I have hereunto set my hand this 31st day of August, 1922.

JAMES WILKINSON.